July 2, 1946.  W. R. HIGHT ET AL  2,403,000
AUTOMATIC CORRECTION DEVICE FOR GYROSCOPIC COMPASSES
Filed Nov. 30, 1937  3 Sheets-Sheet 2
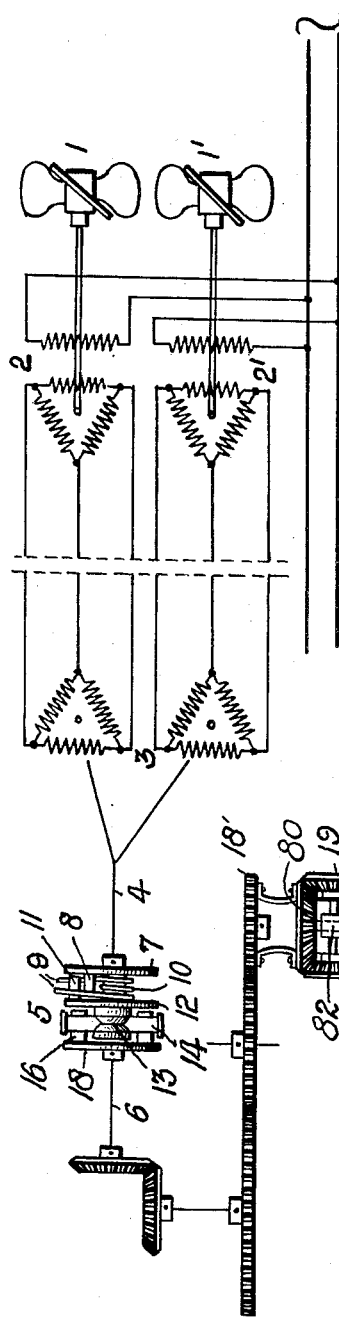
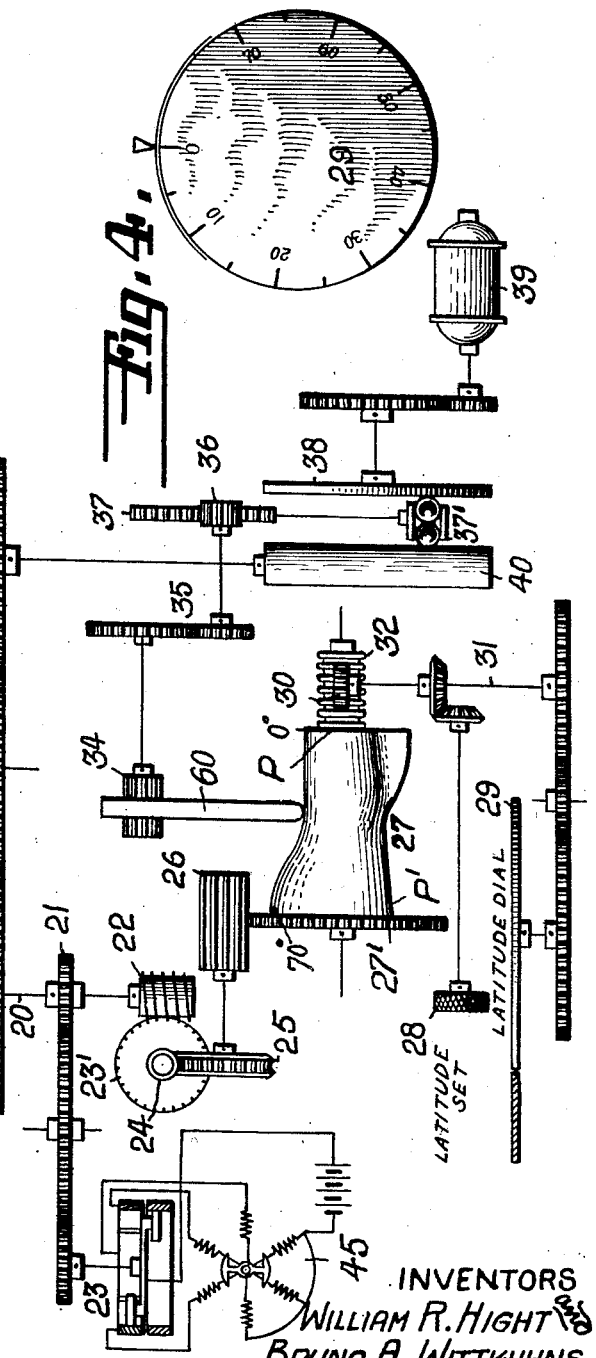
INVENTORS
WILLIAM R. HIGHT and
BRUNO A. WITTKUHNS
BY
Herbert H. Thompson
THEIR ATTORNEY

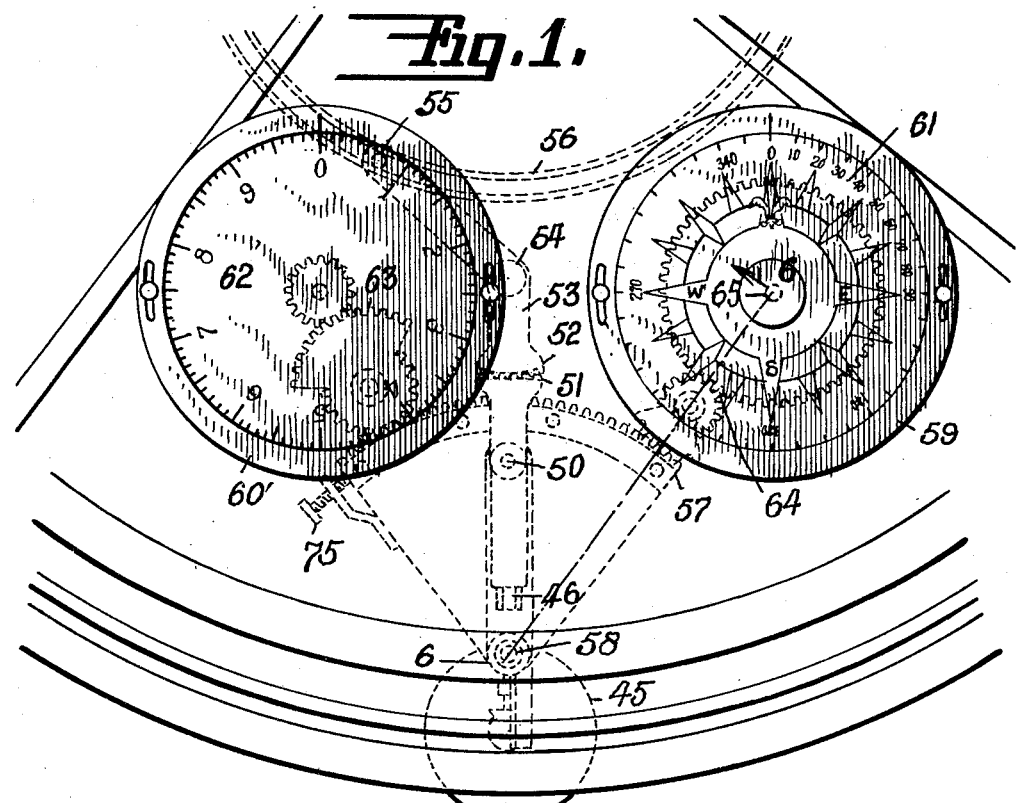
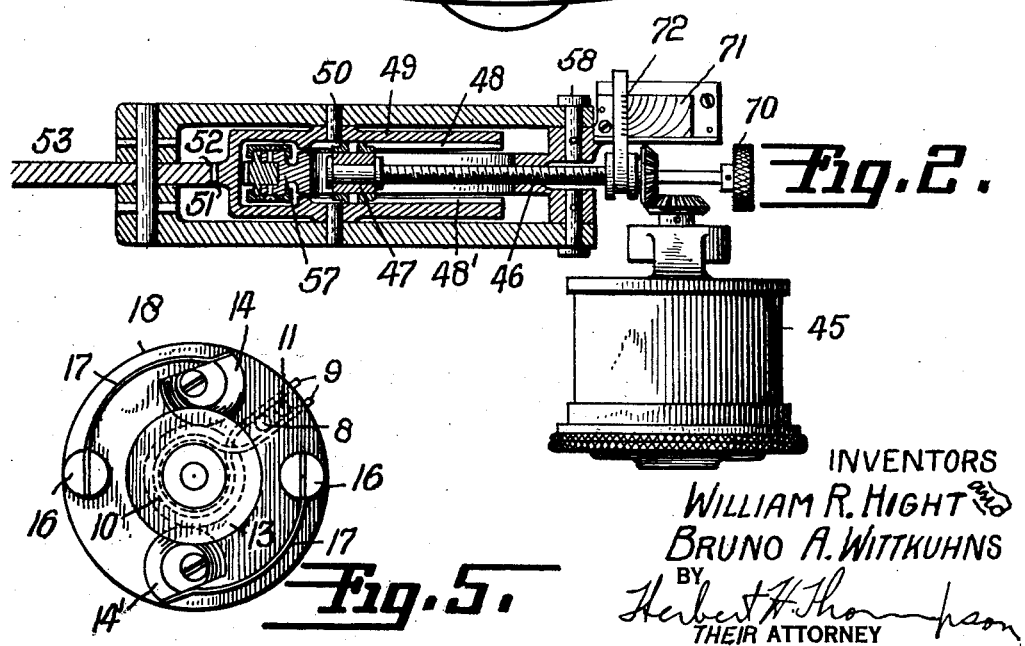

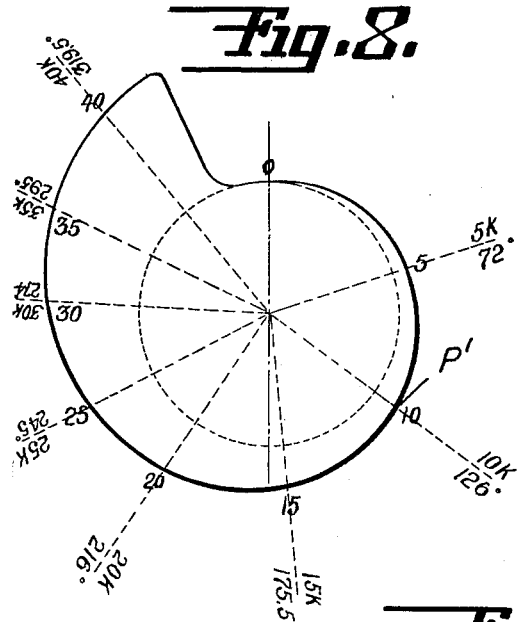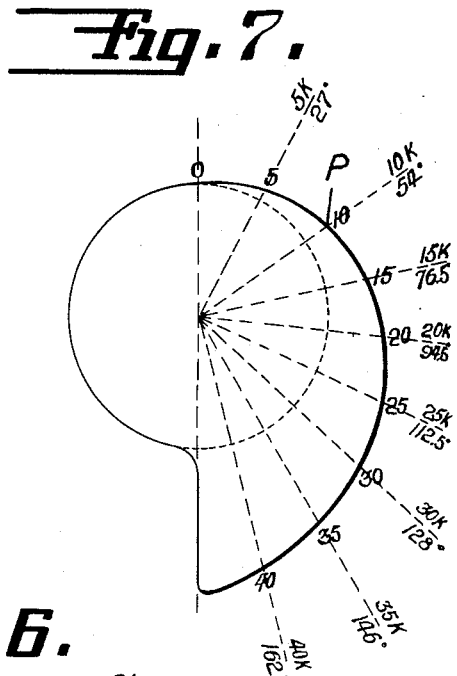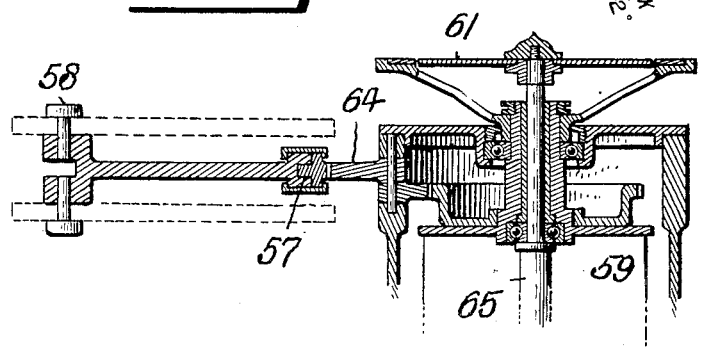

Patented July 2, 1946

2,403,000

UNITED STATES PATENT OFFICE 2,403,000

AUTOMATIC CORRECTION DEVICE FOR GYROSCOPIC COMPASSES

William R. Hight, St. Albans, N. Y., and Bruno A. Wittkuhns, Summit, N. J., assignors to Sperry Gyroscope Company, Inc., Brooklyn, N. Y., a corporation of New York Application November 30, 1937, Serial No. 177,174

10 Claims. (Cl. 73—178)

This invention relates to automatic correction devices for gyroscopic compasses.

In this art it is well known that the Sperry gyroscopic compass deviates from the true north in accordance with the following equation:

$$D = \frac{aK \cos H}{\cos L} + b \tan L$$

where $a$ and $b$ are constants, $K$ is the linear speed of the ship in knots, $H$ is the angle, in degrees, of the ship's heading or course from the true geographic north, and $L$ is the latitude. Cosine $H$ is introduced automatically from the compass by means of the so-called cosine ring, while the present practice is to set in the speed and cosine $L$ by hand settings graduated in accordance with the speed in knots and latitude of the ship.

The present invention relates to means for setting in speed automatically from the ship's speed. While we are aware that this idea is not broadly new, it has never come into use in practice, probably because a hand setting for cosine $L$ was still required at the compass. Preferably, we combine the ship's speed with cosine $L$ in a device on the instrument panel, so that the only factor of the first element of the equation that is introduced at the compass is cosine $H$, which is also put in automatically.

Referring to the drawings, showing one form our invention may assume,

Fig. 1 is a part of a plan view of a portion of a gyroscopic compass showing the coarse and fine compass cards, with the correction device in dotted lines.

Fig. 2 is a detailed sectional view through the portion of the correction device.

Fig. 3 is a diagrammatic view and partial wiring diagram of the means on the panel for transmitting the speed and latitude corrections to the compass.

Fig. 4 is a plan view of the latitude dial on the same.

Fig. 5 is a detail of the one-way drive between this device and the propeller shafts.

Fig. 6 is a vertical section through the course transmitter and the correction mechanism, taken substantially on line 6—6 of Fig. 1.

Fig. 7 is a cross section through the three-dimensional cam of the correction device, approximately at the zero end of the cam.

Fig. 8 is a similar cross section taken through the other end of the cam.

While the speed of the ship may be obtained in many different ways, we have taken the speed of the propeller or propellers as representative of the ship's speed. The drawings are shown as representing a twin screw ship, in which case the average speed of the two screws 1 and 1' is used. To each propeller shaft we connect a transmitter 2, 2', preferably of the self-synchronous type. These transmitters actuate a double wound "selsyn" differential 3 on the instrument panel which revolves the shaft 4 at a speed proportional to the average speed of the two propellers. Said shaft is connected through a one-way flexible drive 5 to shaft 6 to render the correction device inoperative when the propellers are reversed. Said drive is shown as comprising a disc 7 on shaft 4 having a pin 8 thereon which engages between the two ends 9 of a coil spring 10. A second pin 11 on disc 12 is driven by tension in the spring. The hub 13 of said disc 12 is formed with a V-notch into which are yieldingly pressed the eccentric cams 14 and 14' which are pivoted on a second disc 18 on shaft 6 and spring pressed by curved springs 17, the outer ends of which are clamped to pins 16 on disc 18. Referring to Fig. 5, it will be seen that counter-clockwise rotation of the hub 13 will cause the cams to lock and drive disc 18 with disc 12. Rotation of the hub in the opposite direction, however, will release the cams and result in no drive being imparted to the disc 18. This mechanism is to prevent reversing of the propellers from driving the correction device, the correction device being merely set to zero at that time. Since large vessels seldom travel backwards very far, this mechanism operates satisfactorily during all ordinary conditions.

Shaft 6 is shown as driving, through suitable gearing, a pinion 18' which drives one arm 80 of a three arm differential 19. The second or planetary arm 82 of said differential drives the shaft 20, as will be explained, proportionally to $$\frac{K}{\cos L}$$

and therefore drives through gearing 21 a transmitter 23 which transmits the correction $$\frac{aK}{\cos L}$$

to the compass. The third arm 81 of said differential is driven through gear 42 from a speed integrating variable speed device, as hereinafter explained. Said shaft 20 also has a connection to the computing device, said connection being in the form of a worm 22 driving a worm wheel 23', on the shaft of which is shown a second worm 24 driving a worm wheel 25, the latter turning an elongated pinion 26 which rotates a special three-dimensional cam 27 through gear 27' so that said cam is positioned rotationally proportionally to $$\frac{K}{\cos L}$$

Said cam is positioned longitudinally by means of the latitude setting knob 28, which is turned until the latitude dial 29 shows the approximate latitude in which the ship is at the time. This operation positions cam 27 longitudinally by means of a pinion 30 on the cross shaft 31, which pinion meshes with circular rack teeth 32 on a cylindrical extension from the cam.

The cam is so laid out that the lift of the pin 60 thereon for each latitude, which is represented by the length of the radius of the spirals in Figs. 7 and 8 beyond the dotted base circle, is proportional to the speed of the ship, and so that the angular distance through which the cam is rotated from the zero position to reach that lift is directly proportional to speed and inversely proportional to the cosine of the latitude $$\left(\frac{K}{\cos L}\right)$$

because the N–S component of the speed of the ship has the least effect on the equator, where the earth's speed is the greatest, and this effect increases with increasing latitude proportionally to $$\frac{1}{\cos L}$$

The cross section of the right hand end of the cam, shown in Fig. 7, is laid out for zero latitude and if the ship is proceeding at 10 knots, the cam would be rotated until the pin lies over point P, i. e., the cam would be rotated through 54°. If the ship, however, is in 70° latitude and proceeding at the same speed, the cam would be rotated through 126° (Fig. 8) so that the pin rests on point P' for the 10 knot speed, the radius being the same in the two cases, and all points of the cam between these two extremes are similarly laid out, the angular distance through which it is necessary to rotate the cam to reach this 10 knot speed varying from 54° to 126° in accordance with $$\frac{1}{\cos L}$$

The speed range is from zero to whatever the maximum speed of the ship is, say 40 knots. The lift of the pin 60 on the cam rotates, through rack teeth thereon (not shown), a pinion 34 which rotates, through suitable gearing 35, a pinion 36 which moves longitudinally a rack bar 37 in proportion to the movements of the pin. Said bar radially positions a ball carriage 37' on a disc 38 which is driven at constant speed from a motor 39, the position of the balls varying from the central position, at which the driven cylinder 40 would stand still, to the maximum speed position at the lower edge of the disc 38, in which the cylinder 40 would be driven at maximum speed. The cylinder 40 therefore, in its total number of revolutions, integrates with respect to time the linear displacement of carriage 37'. The cylinder 40 is connected through suitable gearing 41 and gear 42 to turn the third arm 81 of the differential 19, this mechanism now automatically differentiating the travel of the ship with respect to time, giving speed as a linear displacement of carriage 37'.

A consideration of the mechanism will show that the radial position of the ball carriage 37' on disc 38 will always represent in value the speed of the propeller shafts, since it is only this condition in which a condition of equilibrium is reached. In other words, if the primary arm 88 of the differential is being driven faster than the follow-back arm 81 of this differential driven by gear 42, rotation of shaft 20 would occur, which will readjust the position of the cam 27, and hence of pin 60 and roller carriage 37', through worm gearing 22, 25 and pinion 26 until cylinder 40 is driven at the correct speed to re-establish the condition of equilibrium, in which gears 18' and 42 rotate at equal speeds and in opposite direction.

The cam is also so laid out as to take care of several variables, including the fact that the ship's speed does not vary directly as the propeller speed, but in accordance with a known function thereof, because the relative speed of the ship with respect to the propellers drops down at higher speeds on account of increased slippage losses and head resistance.

As described above, the longitudinal position of the cam represents latitude and the lift of the pin ship's speed, while the angular position is the quotient of speed and cosine of latitude, or, in other words, $$\frac{aK}{\cos L}.$$

That is to say, the unknown of the mechanism appears as the rotation of the cam. The transmitter 23 will therefore be driven through a distance representing the desired correction to transmit to the gyro compass, the transmitter driving a repeater motor 45 connected to the correction device on the gyro compass in place of, or in addition to the standard setting knob for speed and latitude on the gyro compass.

The correction device shown is of the type shown in the prior patent to J. L. Chantemerle, #1,917,017, dated July 4, 1933, in which the combined latitude and speed correction is introduced through turning of a single screw shaft 46 to position it in accordance with $$\frac{aK}{\cos L}$$

and which positions a slider 47 sliding in upper and lower trackways 48, 48' in a pivotally mounted U-shaped member 49 pivoted on pins 50. For hand setting, the knob 70 is turned until the proper speed curve on plate 71 intersects the proper latitude mark on vertical scale 72. Said U-shaped member is shown as having segmental gear teeth 51 thereon which mesh with similar teeth 52 in an arm 53 pivoted at 54, and the opposite end of which has a pin 55 engaging the cosine cam or eccentric ring 56 on the gyro compass. Since said ring only rotates to move pin 55, it may be said to be a two-dimensional cam as distinguished from the three-dimensional cam 27. Relative turning of the ship and compass will therefore rotate the arm 53, thus rotating the member 49 through a distance proportional to cosine H. The rotation of member 49 is transmitted to the gear sector 57 through the slider 47, said sector being pivoted on pins 58, thereby introducing the latitude and speed factors of the first member of the equation. The movement of the gear sector 57 is transmitted, respectively, to correct the effective position of the coarse and fine transmitters 59 and 60' on top of the gyro compass, the armature shafts 65 of which are turned from the azimuth motor (not shown) in the gyro compass at 1:1 and 36:1 ratios, each transmitter shaft being provided, respectively, with a 360° compass card 61 and a fine card 62, the latter graduated into ten equal sectors each representing 1°. The correction device displaces the field of each transmitter proportionally to the correction required, the correction being, of course, multiplied by a 36:1 ratio for the fine transmitter and card by means of the step-up gearing 63, as compared to the reducing gearing 64 connecting sector 57 and the coarse transmitter.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described our invention, what we claim and desire to secure by Letters Patent is:

1. In an automatic correction device for ships' gyro compasses, a variable speed integrating device including a constantly driven disc, a roller carriage radially positioned thereon and a cylinder driven by said carriage, a three-arm differential device including one arm driven at a speed proportional to the ship's speed, and a second arm driven by said cylinder, a follow back connection between the third arm of said differential and said roller carriage to radially position the latter, a computing mechanism in said connection, a latitude setting in said mechanism, whereby said third arm of said differential is positioned in accordance with the proper function of the speed and latitude of the ship, and means for connecting said third arm to said compass for correcting the latter.

2. In an automatic correction device for ships' gyro compasses, a three-dimensional cam and cam pin, means for relatively positioning the same in one dimension in accordance with the latitude (L), automatic means for relatively positioning the same in another dimension so that the lift of the cam pin in the third dimension is proportional to the measured ship's speed (K), said cam being so laid out that the required movement of said cam in said second dimension is proportional to $$\frac{K}{\cos L}$$

and means for introducing the movement of said cam in said second dimension into said correction device.

3. In an automatic correction device for ships' gyro compasses, a three part differential device, means for driving one part thereof at a speed proportional to ship's speed, a variable speed integrating device for driving another part of said device and having a linearly adjustable member to vary the output thereof, interconnecting means between the third part of said differential and said member to adjust the same so that the output of said integrator matches the ship's speed, said interconnecting means including means for compensating for the effect of latitude on the correction, and transmitting means for positioning a part on said compass in accordance with the position of said third part of said differential device for correcting said compass.

4. In an automatic correction device for ships' gyro compasses, a three part differential device, means for driving one part thereof at a speed proportional to ship's speed, a variable speed integrating device for driving another part of said device and having a linearly adjustable member to vary the output thereof, interconnecting means between the third part of said differential and said member to adjust the same so that the output of said integrator matches the ship's speed, whereby the distance moved by said member is proportional to the speed of the ship, and means connecting said third part of said differential to said compass for correcting the latter.

5. In an automatic correction device for ships' gyro compasses, a three-dimensional cam and cam pin, means for relatively positioning the same axially in accordance with the latitude (L), means for automatically deriving from the ship's movements its rate of speed, means for relatively positioning said cam rotationally so that the lift of the cam pin is proportional to said ship's speed (K), said cam being so laid out that the required relative rotational movement of said cam is proportional to $$\frac{K}{\cos L}$$

and means for introducing said last named movement into said correction device.

6. In an automatic correction device for ships' gyro compasses, a three-dimensional cam and cam pin unit, manual means for positioning the parts of said unit in one dimension in accordance with the latitude (L), means for automatically positioning said parts in another dimension so that the lift of the cam pin is proportional to ship's speed (K), said cam being so laid out that the required movement of said parts in said second dimension is proportional to $$\frac{K}{\cos L}$$

two-dimensional cam means actuated by relative turning of the compass and ship giving a correction proportional to heading (cos H), means for transmitting said movement of said cam to said compass, means for multiplying said correction by said $$\frac{K}{\cos L}$$

and means for applying the resultant as a course-speed-latitude correction to said compass.

7. In an automatic correction device for ships' gyro compasses, means for determining the ship's speed, a three-dimensional cam and cam pin, means for manually relatively positioning the same in one dimension in accordance with latitude (L), and speed integrating means for automatically relatively positioning the same in another dimension proportional to the ratio of the ship's speed to the cosine of the latitude $$\left(\frac{K}{\cos L}\right)$$

the correct value of said second positioning being reached when the lift of the cam pin becomes proportional to the continually and automatically introduced actual speed of the ship (K).

8. In an automatic correction device for ships' gyro compasses, a three-dimensional cam and cam pin, means for relatively positioning the same in one dimension in accordance with the latitude (L), automatic means for relatively positioning the same in another dimension until the relative movement in the third dimension matches the measured ships' speed (K), said cam being so laid out that the required relative movement in said second dimension is proportional to $$\frac{K}{\cos L}$$

and means for introducing said last named movement into said correction device.

9. In an automatic correction device for ships' gyro compasses, a three-arm differential, one arm of which is rotated continuously at a speed proportional to the ship's speed (K), a variable speed device for rotating another arm including a constant speed driving member, a variable speed driven member and an adjustable intermediate member connecting said other members, the position of which is a measure of the speed at which the variable speed member is driven, a three-dimensional cam and cam pin means, means for relatively positioning said cam means in one dimension in accordance with the latitude (L), means connecting the third arm of said differential to position the cam means in a second dimension, the resultant movement of the cam means in the third dimension positioning said intermediate member, said cam means being so laid out that the required movement of the cam in the second dimension is proportional to $$\frac{K}{\cos L}$$

and means for introducing the movement of said third arm into said correction device.

10. In an automatic correction device for ships' gyro compasses, a three-arm differential, one arm of which is rotated continuously at a speed proportional to the ship's speed (K), a variable speed device for rotating another arm including a constant speed driving member, a variabl speed driven member and an adjustable intermediate member connecting said other members, the position of which is a measure of the speed at which the variable speed member is driven, a three-dimensional cam and cam pin, means for positioning said cam in one dimension in accordance with the latitude (L), means connecting the third arm of said differential to position the cam in a second dimension, the resultant lift of the cam pin positioning said intermediate member, said cam being so laid out that the required movement of the cam in said second dimension is proportional to $$\frac{K}{\cos L}$$

and means for introducing the movement of said third arm into said correction device.

WILLIAM R. HIGHT.
BRUNO A. WITTKUHNS.